(12) United States Patent
Sartori et al.

(10) Patent No.: US 11,010,044 B2
(45) Date of Patent: May 18, 2021

(54) SWIPE-BASED PIN ENTRY

(71) Applicant: Shopify Inc., Ottawa (CA)

(72) Inventors: Luke James Sartori, Toronto (CA); Mir Mustafa Ali, Markham (CA); Theresa Jia Ying Zeng, Richmond Hill (CA); David Grant Seal, Ottawa (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 16/423,224

(22) Filed: May 28, 2019

(65) Prior Publication Data

US 2020/0379621 A1 Dec. 3, 2020

(51) Int. Cl.
*G06F 3/0488* (2013.01)
*G06Q 20/40* (2012.01)
*G06F 3/023* (2006.01)

(52) U.S. Cl.
CPC ....... *G06F 3/0488* (2013.01); *G06Q 20/4012* (2013.01); *G06Q 2220/00* (2013.01)

(58) Field of Classification Search
CPC .............. G06F 3/0488; G06Q 20/4012; G06Q 2220/00
See application file for complete search history.

(56) References Cited

U.S. PATENT DOCUMENTS

| | | | | |
|---|---|---|---|---|
| 6,209,102 B1* | 3/2001 | Hoover | ................... | G06F 21/36 726/18 |
| 6,744,427 B2* | 6/2004 | Maglio | ................. | G06F 3/0233 341/22 |
| 7,333,602 B2* | 2/2008 | Habu | .................... | G06F 3/0219 379/368 |
| 7,698,563 B2* | 4/2010 | Shin | ........................ | G06F 21/36 713/184 |
| 7,932,810 B2* | 4/2011 | Gartner | .............. | G07C 9/00912 340/5.2 |
| 8,130,075 B1* | 3/2012 | Hingole | ................ | G06F 3/0481 340/5.55 |
| 8,311,530 B2* | 11/2012 | Kornilovsky | ........... | G06F 3/041 455/418 |
| 8,504,842 B1* | 8/2013 | Meacham | ............. | G06F 3/0488 713/182 |
| 8,881,251 B1* | 11/2014 | Hilger | ..................... | G06F 21/31 726/7 |
| 8,949,902 B1* | 2/2015 | Fabian-Isaacs | ...... | H04N 21/439 725/52 |
| 8,959,620 B2* | 2/2015 | Hsueh | ..................... | G06F 21/36 726/18 |

(Continued)

OTHER PUBLICATIONS

Elina Jokisuu, Mike McKenna, Andrew W.D. Smith, Phil Day, Touchscreen Accessibility in Self-Service Terminals, 2016, 20 pages (Year: 2016).*

(Continued)

*Primary Examiner* — Yongjia Pan
(74) *Attorney, Agent, or Firm* — GTC Law Group PC & Affiliates

(57) ABSTRACT

Methods, systems and devices are provided for input of a sequence of digits such as a PIN code or password. A user can use swipe motions to choose the value of a digit and double tap to accept a digit, and swipe up to confirm that input of the sequence of digits is complete. Embodiments can be implemented on point of sale devices, merchant devices and customer devices including mobile devices.

38 Claims, 8 Drawing Sheets

(56) References Cited

U.S. PATENT DOCUMENTS

| | | | |
|---|---|---|---|
| 9,444,626 B2* | 9/2016 | Kim | G06F 3/017 |
| 10,262,182 B2* | 4/2019 | Han | G06F 21/31 |
| 2007/0030963 A1* | 2/2007 | Wyld | G06F 3/038 |
| | | | 380/44 |
| 2007/0177803 A1* | 8/2007 | Elias | G06F 3/04883 |
| | | | 382/188 |
| 2009/0038006 A1* | 2/2009 | Traenkenschuh | G07C 9/33 |
| | | | 726/21 |
| 2009/0241072 A1* | 9/2009 | Chaudhri | G06F 3/04883 |
| | | | 715/863 |
| 2010/0321296 A1* | 12/2010 | Gross | G06F 21/83 |
| | | | 345/163 |
| 2011/0080351 A1* | 4/2011 | Wikkerink | G06F 3/04883 |
| | | | 345/173 |
| 2013/0076642 A1* | 3/2013 | Rampson | G06F 3/0488 |
| | | | 345/173 |
| 2013/0081133 A1* | 3/2013 | Hetroy | G06F 3/0488 |
| | | | 726/16 |
| 2014/0258899 A1* | 9/2014 | Mantuano | G06F 3/04847 |
| | | | 715/765 |
| 2015/0095241 A1* | 4/2015 | Edwards | G06F 21/36 |
| | | | 705/72 |
| 2015/0100498 A1* | 4/2015 | Edwards | G06Q 20/4012 |
| | | | 705/72 |
| 2016/0232364 A1* | 8/2016 | Curtis | G06F 3/017 |
| 2017/0091431 A1* | 3/2017 | Jakobsson | G06F 3/04883 |
| 2017/0322722 A1* | 11/2017 | Irvine | G06F 3/0414 |

OTHER PUBLICATIONS

Money Talks: An Overview of Access to Automated Teller Machines, Jul. 2001, 5 pages (Year: 2001).*

Carmen Willings, Make the iOS Device Accessible, Jul. 18, 2018, 5 pages (Year: 2018).*

Need help to counton left or right swipe, Jul. 2, 2014, 3 pages (Year: 2014).*

* cited by examiner

Fig. 2

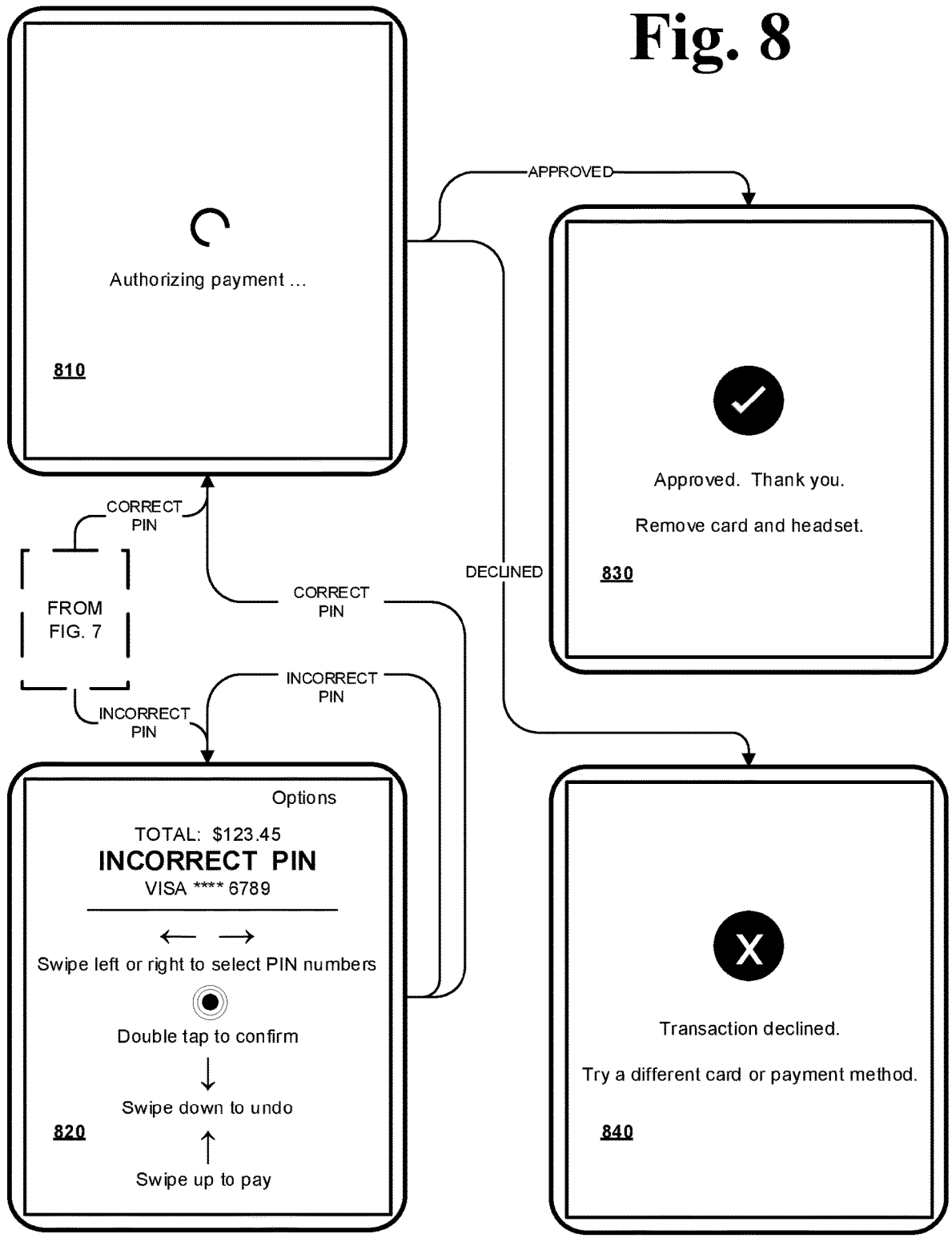

SWIPE-BASED PIN ENTRY

FIELD

The present disclosure relates to methods and systems for entering a sequence of digits on a touch screen display, including entering a PIN code on a device to complete a transaction.

BACKGROUND

Modern point-of-sale (POS) systems utilizing debit, credit or pre-paid cards for payment frequently require that a customer enter a specific pre-designated code, or personal identification number (PIN), into a POS device to authorize a transaction. Unfortunately, these commercial off the shelf (COTS) POS devices are difficult for visually impaired individuals to use since these solutions often include a touch-based display having a smooth surface, rather than traditional keypads with raised braille or tactile, functional buttons. Because assistance may be required from another person (e.g. a customer service representative, nearby customer in line willing to help, and the like), a visually impaired individual's PIN code may be compromised to the person rendering assistance or more generally (e.g. overheard). In addition, even if a visually impaired individual enters their PIN code successfully without assistance, they may not be able to conceal their PIN code entry from other individuals or camera surveillance.

Laws, including the Americans with Disabilities Act (ADA), have resulted in a growing emphasis in providing equal services to the visually impaired. To comply with the ADA, often retail stores will install crude modifications to POS devices to assist visually impaired customers with checkout. For example, a speaker may be installed on the POS device to audibly broadcast content on the screen or broadcast the keys typed. However, such public audio solutions fail to address confidentiality that should be present during the completion of a financial transaction.

Not surprisingly, the problem of securely entering a sequence of digits on a touch-based display exists outside the retail and shopping industry as well, wherever a private sequence of digits needs to be entered (e.g. a password and the like) on a touch screen display (e.g. a mobile device). What is needed in the art is an integrated solution, such that a visually impaired person does not need the assistance of another person to enter a private sequence of digits in a secure, confidential manner.

SUMMARY

In an aspect, a method for assisting a user in entering a sequence of digits on a touch screen display may include: receiving a user input through the touch screen display, wherein the user input includes a first motion to choose a digit and a second motion to accept the digit; repeating the receiving for each subsequent digit in the sequence of digits; and receiving another input from the user through the touch screen display, wherein the other user input includes a third motion confirming the input of the sequence of digits may be complete. In embodiments, the method may include providing instructions to the user through an audio output. The digits may be whole numbers between 0 and 9, alphabetic, alpha-numeric or other number or character sets. The method may include determining a start digit following the step of providing instructions to the user. The start digit may be a middle digit in a set of possible digits. The digits may be whole numbers between 0 and 9 and the start digit may be 5. The start digit may be a random digit. The subsequent digit may start as the previously accepted digit. The first motion may be a swipe motion and the second motion may be a tap motion. A swipe-right motion may increment the digit and a swipe-left motion may decrement the digit. A swipe-left motion may increment the digit and a swipe-right may decrement the digit. A double-tap motion may accept the digit. A swipe-down motion may perform an undo operation. A swipe-down motion may choose a digit different from an accepted digit or may choose a different sequence of digits. A swipe-up motion may confirm the input of the sequence of digits is complete. The method may include: providing instructions to the user through an audio output; determining a start digit following the step of providing instructions to the user; wherein the digits may be whole numbers between 0 and 9 and the start digit may be 5; wherein swiping right increments the digit and swiping left decrements the digit; wherein tapping to accept the digit may be a double tap; wherein the step of swiping and tapping further includes swiping down to undo; and wherein the control confirming that the input of the sequence of digits is complete may be swiping up.

In an aspect, a device for assisting a user to enter a sequence of digits may include: a touch screen display configured to receive input from the user; wherein the user inputs the sequence of digits by: receiving input from the user through the touch screen display, wherein the user inputs the sequence of digits by: swiping to choose a digit, tapping to accept the digit; repeating this procedure for each subsequent digit; and providing a control confirming the input of the sequence of digits may be complete. In embodiments, the device may include an audio output for providing instructions to the user and wherein providing instructions to the user may be via the audio output. The audio output may be a headphone jack or wireless (e.g. radio frequency, Bluetooth and the like) or other conventional audio output. The device may be a mobile device, a POS device, a merchant device or other computing device. The device may include a mouse, wherein the step of receiving input may be through the mouse.

In an aspect, a method for assisting a user in entering a sequence of PIN digits on a payment device configured with a touch screen display may include: receiving input from the user through the touch screen display, wherein the user inputs the sequence of PIN digits by: swiping to choose a digit, tapping to accept the digit; repeating this procedure for each subsequent digit; and providing a control confirming the input of the sequence of PIN digits may be complete. The method may include providing instructions to the user through an audio output. The digits may be whole numbers between 0 and 9, alphabetic, alpha-numeric or other number or character sets. The method may include entering an accessibility mode prior to the step of providing instructions to the user. The method may include automatically entering accessibility mode by the payment device identifying the user. The method may include determining a start digit following the step of providing instructions to the user. The start digit may be a middle digit in a set of possible digits. The digits may be whole numbers between 0 and 9 and the start digit may be 5. The start digit may be random. The method may include transmitting the sequence of PIN digits following the step of repeating this procedure for each subsequent digit. The method may include providing a transaction result following the step of transmitting the sequence of PIN digits. The subsequent digit may start as the previously accepted digit. Swiping right may increment the digit and swiping left may decrement the digit; or, swiping left may increment the digit and swiping right may decrement the digit. When tapping to accept the digit, it may be a double tap. Swiping and tapping may include swiping down to undo. The control confirming that the input of the sequence of PIN digits is complete may be swiping up. The method may include: providing instructions to the user through an audio output; entering accessibility mode prior to the step of providing instructions to the user; determining a start digit following the step of providing instructions to the user; transmitting the sequence of PIN digits following the step of repeating this procedure for each subsequent digit; providing a transaction result following the step of transmitting the sequence of PIN digits; the digits may be whole numbers between 0 and 9 and the start digit may be 5; the subsequent digit may start as the previously accepted digit; swiping right may increment the digit and swiping left may decrement the digit; tapping to accept the digit may be a double tap; swiping and tapping may include swiping down to undo; the control confirming that the input of the sequence of PIN digits is complete may be swiping up.

In an aspect, a payment device for assisting a user to enter a sequence of PIN digits may include: a touch screen display configured to receive input from the user; wherein the user inputs the sequence of PIN digits by: receiving input from the user through the touch screen display, wherein the user inputs the sequence of PIN digits by: swiping to choose a digit, tapping to accept the digit; repeating this procedure for each subsequent digit; and providing a control confirming the input of the sequence of PIN digits may be complete. The payment device may include providing instructions to the user. The payment device may include an audio output for providing instructions to the user and wherein the providing instructions to the user may be through an audio output. The audio output may be configured on the payment device. The audio output may be a headphone jack, wired or wireless (e.g. radio frequency, Bluetooth and the like). The payment device may be a mobile device, a POS device, a merchant device or any computing device. The payment device may include a mouse, wherein the step of receiving input may be through the mouse.

BRIEF DESCRIPTION OF THE FIGURES

FIG. 2 depicts an embodiment for a home page of an administrator.

FIGS. 6 through 8 depict an embodiment of a user interface for inputting a PIN code to complete a transaction.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
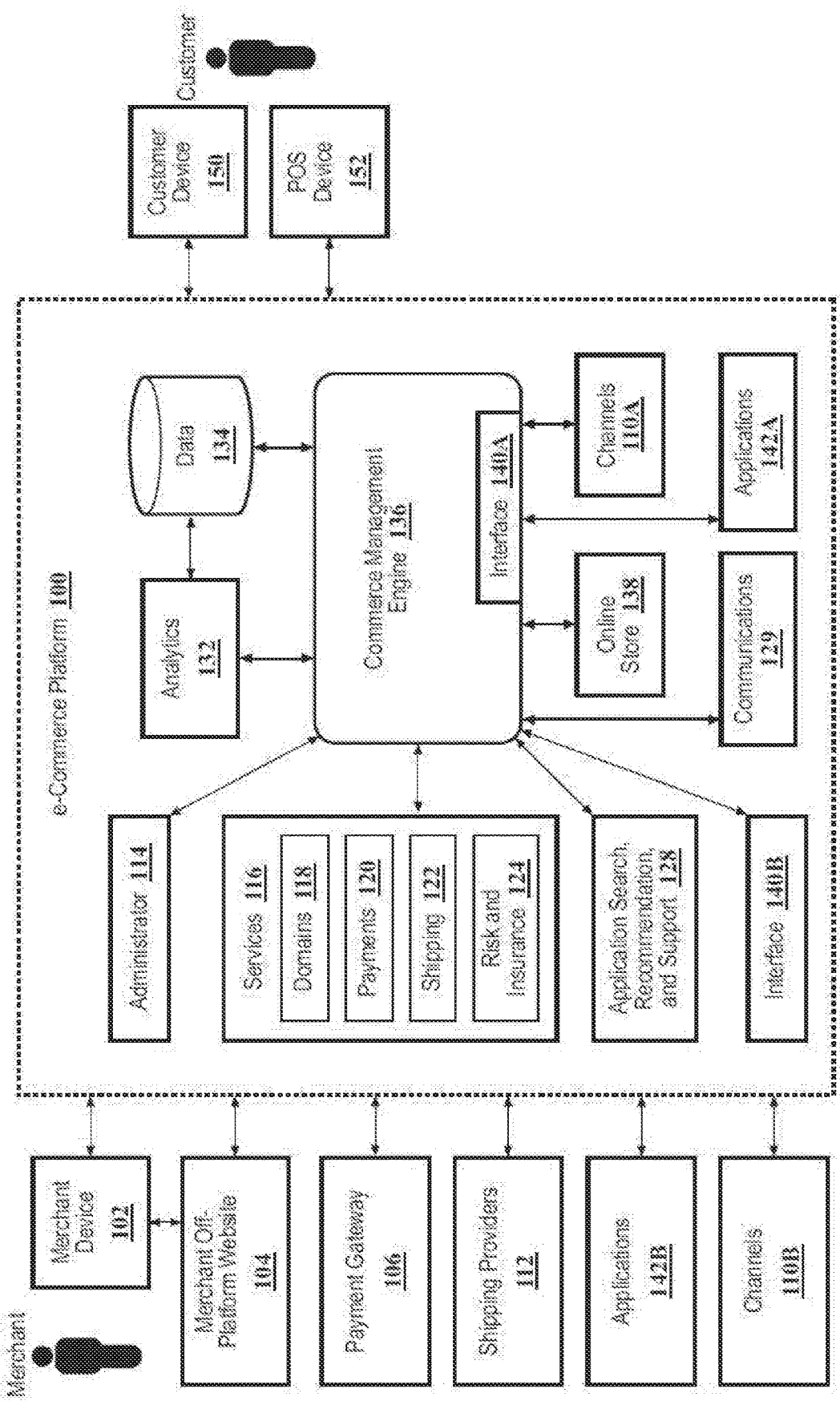
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
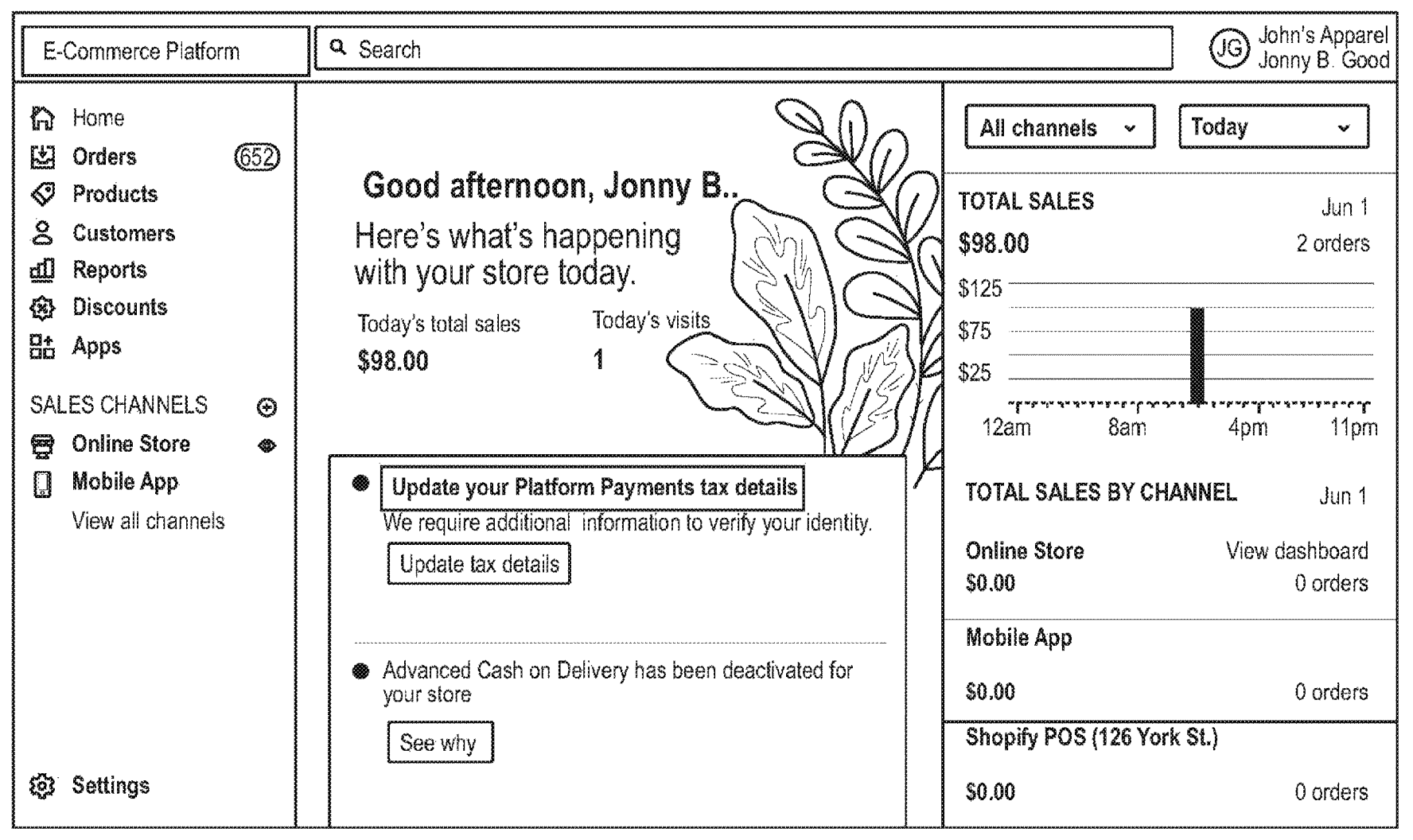

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

For visually impaired customers, problems are presented when a device used to complete a transaction does not have a keypad or tactile buttons. For example, ease of use and confidentiality, which are both lacking in prior art solutions, are highly valued features for visually impaired and other customers in modern shopping environments. These problems may be addressed by various embodiments disclosed herein, utilizing audio instructions provided through an audio output, with corresponding navigation controls (e.g. swipes, taps, and the like) and other controls received on a touch screen display, such as in an accessibility mode.

In embodiments, a device (e.g. a POS device) may be configured to enable a user, for example a visually impaired user, to iteratively choose and accept individual digits of a sequence of digits via swipe and tap motions, and confirm or submit the input sequence of multiple digits to complete an authentication and/or verification process (e.g. enter a password, complete a PIN code input to authenticate payment for a transaction, and the like). In embodiments, a user may be a customer and the terms customer and user may be used interchangeably throughout.

For purposes of the following disclosure, reference to an accessibility mode may denote a mode or configuration for the device, which, when activated, enables the functionality described herein for entering and confirming a sequence of digits. In other embodiments, reference to an accessibility mode may simply refer to the functionality itself without requiring a special device mode or configuration.

In embodiments, an accessibility mode on a device may be activated: (i) by the user pressing a button on the device or selecting an option on the touch screen display (e.g. with or without assistance from another person), (ii) by a merchant or customer service representative remotely enabling accessibility mode from a merchant device 102 or other device, (iii) upon detection by the device of a connection with an external hearing aid device such as a headphone or headset via a wired or wireless connection or (iv) by other triggering conditions. For example, without limitation, a triggering condition may be a POS device 152 that may identify a given user (such as based on the card provided) as historically enabling accessibility mode; thus, the POS device 152 automatically enables accessibility mode upon a card swipe, chip read or other user-identifiable action occurring during a transaction. In embodiments, a device may typically or always have accessibility mode enabled so a separate enabling step may not be required. Throughout this disclosure, in embodiments, any connection with a hearing device may be a private connection, such as a private or secure wireless connection, and in other embodiments may be a radio broadcast connection.

For purposes of this disclosure, a button (such as a button to enable accessibility mode) may also include, without limitation, a defined region of the screen (e.g. with or without a line border), a responsive link or other portion of the touch screen display, or a physical button or key which, upon user touch or input, may initiate a motion, action or control.

In embodiments, audio instructions or audio prompts as described herein may be provided through an audio output such as a speaker configured on the device, a headphone jack, a wireless output (e.g. Bluetooth and the like), a tactile or braille output means, or other conventional audio or non-visual output means. If a headphone jack or wireless output is not initially recognized upon enabling of accessibility mode, it may be helpful to provide initial audio instructions through a speaker to assist a user (or a merchant in assisting a customer) in connecting to a private/secure audio output (e.g. by plugging in personal headphones, by connecting a, possibly secure, Bluetooth headset, and the like). In embodiments, once a private/secure audio output connection (e.g. headphones connected, Bluetooth connected, and the like) is recognized as being present, then audio output to the speaker (which is not private) may be abated. Thus, audio output in different forms may be helpful to provide a user initial guidance to connect a private audio listening device, as well as provide continued step-by-step instructions and prompts when inputting a sequence of digits or completing a transaction. In embodiments, instead of using audio, the described audio instructions may be provided to or using a mobile or other tactile or braille output means, such as a printer or haptic device.

In embodiments, accessibility mode and accompanying audio output options may be configured on a diversity of devices including but not limited to a POS device 152, a merchant device 102, a customer device 150, a mobile device, or other devices, depending upon the context and needs of specific applications and their embodiments.

In embodiments, once accessibility mode is enabled (if present), a prompt may be provided to hear or otherwise be provided with instructions. Alternatively, once accessibility mode is enabled (if present) and headphones have been plugged in, a prompt may be provided to hear or otherwise be provided with instructions. In other embodiments, instructions may be automatically provided upon enablement of accessibility mode. During the providing of the instructions an option may be provided to skip the instructions, or alternatively the instructions may be automatically skipped if the user begins entry (such as of PIN digits). In yet other embodiments, once accessibility mode is enabled (if present), instructions may be automatically skipped with an option to provide the instructions upon request (such as upon a specified user input such as confirmation action (e.g., swipe up)).

In embodiments, once accessibility mode is enabled (if present), a visually impaired user may step through the input of a sequence of digits one digit at a time at his or her own speed, hear each digit or control, and proceed with a desired action through configured motion controls received on the touch screen display. In accessibility mode, all or some of the screens in the user interface may be visually different than prior art screens presented when accessibility mode is not enabled. More particularly, screens presented in accessibility mode may be directed toward selection and confirmation of digits through swipe and tap controls, rather than visual-based selections/options (e.g. screen drawn push buttons corresponding to specific numbers).

In embodiments, while accessibility mode is enabled, swipe motions (e.g. swiping or dragging a finger across a touch screen display) may be configured for choosing a digit to input from a configured set of digits. Audio prompts may be configured to navigate and assist in the accuracy and duration of the swiping motion, such as speaking the current value of the digit in real-time (as the swiping motion occurs) into the audio output. For example, swiping one direction (e.g. swipe right) may increment the value of a current digit (e.g. if the current digit value is 5 it may be incremented to 6, then to 7, and the like); whereas swiping the opposite direction (e.g. swipe left) may decrement the value of the currently-input digit (e.g. if the current digit value is 5 it may be decremented to 4, then to 3, and the like). As a swipe motion is provided by the user, the user may be receiving audible prompts in real-time of the new/current value of the digit in response to the swipe motion. For purposes of this disclosure, a swipe-left motion may be considered equivalent to swiping left (e.g. in a leftward direction), a swipe-right motion may be considered equivalent to swiping right (e.g. in a rightward direction), a swipe-up motion may be considered equivalent to swiping up (e.g. in an upward direction), and a swipe-down motion may be considered equivalent to swiping down (e.g. in a downward direction). Of course, other diagonal swipes or swiping, arcs or other directional or shape motions may be considered within the scope of a swipe motion without limitation by the disclosure herein. Similarly, a single-tap motion and a double-tap motion are considered tapping motions, but the scope of tapping motions is not limited (e.g. triple-tap, tap-hold, and the like) by these aforementioned tapping motions.

In embodiments, swiping past the end value of a set of possible digits may be selectively configured to wrap around to the opposite end value in the set. For example, in a set single digit numbers, swiping to increment 9 wraps to 0 and swiping to decrement 0 wraps to 9.

In embodiments, a starting digit value may be an initial value of the first digit before any user swiping or other motion/control occurs. A starting digit value may be set as a fixed number, a random number, a configured value (e.g. by the user, customer, merchant or e-commerce platform), or any other desired initial value for the needs or application of an embodiment. For example, in a set of single digit numbers for possible digit values (e.g. such as a PIN code), a starting digit value of 5 may be advantageous as it is located in the middle of the set of potential values. In embodiments, a starting digit may be pre-set in relation to a given user, such as stored in relation to an identifier unique to the user, or stored in relation to a card, or an account (e.g. pay account, debit or credit card account, merchant account, etc.) associated with or used by a given user.

Once a digit is accepted/confirmed, the next digit in the sequence may initially be configured with the value of the previous digit value that was input. By way of example, if a customer's PIN code is 7712: (i) a starting digit may be configured as 5, (ii) wherein the customer swipes to increment to choose 7, (iii) then the customer accepts the value of 7 for the digit, (iv) wherein the next digit may have an initial value of 7 continuing from the value of the previous digit input. This may be of benefit when a customer chooses a PIN code which has one or more repeating numbers. It may also have desirable security benefits, since it will be more difficult for other persons or camera surveillance to discern the swiping of a sequence of digits when any given digit does not begin with the same number for each digit. Repeating the value of the previous digit can have other intuitive user interface benefits as well since the user can become accustomed to a specific swiping pattern. In alternate embodiments, the next digit value may alternatively be a fixed value (e.g. 5), a random value from the set of possible values, or any other configured or formulated value as desired by the context or application of the embodiment, including a pre-set digit in relation to a given user, such as stored in relation to a card used by a given user.

In embodiments, once the value of a digit has been chosen and is ready to be accepted, a tap motion may be provided by the user to proceed. Tap motions (e.g. a double-tap on the touch screen display) may be configured for accepting or confirming the digit currently being input, such that the user can move to the next digit to input. Thus, by way of example, when entering a four-digit sequence of the whole numbers 1234, the user may swipe to choose 1 (with audible prompts), double-tap to confirm that digit, then swipe to increment to choose 2 (with audible prompts), double-tap to confirm that digit, and so forth through the remaining two digits.

In embodiments, if a mistake is made or the user wishes to undo the previous digit input, an alternate swipe motion (e.g. swipe down) may be configured to back up in the input process. A second alternate swipe motion (e.g. swipe up) may be configured to confirm completion of the input of the sequence of digits, once the user has completed input of all the digits. In other embodiments, the motion and control of confirming completion of the input of digits may not be necessary and may be omitted where a fixed number of digits is necessary to be entered (e.g. a PIN code typically having four digits).

In embodiments, swipe motions may be: (i) horizontal from left-to-right (swipe right) or right-to-left (swipe left), (ii) vertical from top-to-bottom (swipe down) or bottom-to-top (swipe up), (iii) diagonal from one corner of the touch screen display to an opposite corner of the touch screen display, (iv) numeric motions (e.g. draw the number 5), (v) alphabetic motions (e.g. draw the letter C), (vii) motions containing a plurality of fingers (e.g. multi-finger swipe), or (vii) any other touch motion evidencing a path of touch on a screen that may be designated by the configuration of the embodiment.

In embodiments, tap motions may be any singular or plurality of taps, with or without a hold following the tap (e.g. a tap-hold). Any form of tapping motion may be provided by a single finger or a plurality of fingers (e.g. multi-finger tap) as well. Thus, when referring to a tapping motion herein, a tap or tapping motion may be configured as: a single-tap, a double-tap, a tap-hold, a tap/tap-hold by a plurality of fingers, or any combination of the foregoing or other variations.

In addition to the diversity of swipe motions, tap motions and other controls described herein, the configuration of any intended action (e.g. selecting a digit value) to any given motion or control herein (e.g. horizontal swiping) is merely suggestive and any swipe, tap or other control can be configured for any desired action/command, depending upon the particular needs or application of an embodiment. In addition, any tap motion may be substituted for any swipe motion described herein and any swipe motion may be substituted for any tap motion described herein.

In embodiments, during the process of entering digits, assistance or instructions (e.g. audio help) may be provided automatically (e.g. all the time, or as the system determines that assistance is needed) or by request from the user. For example, the prompt "One digit entered. Enter the second digit of your PIN now, or swipe down to remove the last digit entered," may be provided to the user after entering the first digit (possibly in response to the user pausing for a few seconds without further input after entering the first digit), representing the next logical step in the process. In another example, after four digits have been entered there may be a pause, followed by the instruction "Four digits entered. If your PIN is complete, swipe up to complete transaction. To make changes swipe down." Such assistance or instructions may be selectively turned on or turned off by the user.

Haptics may be integrated into the feedback provided to a user with respect to swiping or tapping motions or other actions disclosed herein for a more intuitive user experience. Since haptics may also pose a security risk as haptics can be more easily detected by other persons or surveillance equipment (e.g. visually, audibly and other means depending upon the haptics, device and device location), implementation details may include vibration isolation, attenuation, possibly in only certain directions, and the like.

In embodiments, upon completion of the input of a sequence of digits, the sequence of digits may optionally be transmitted. For example, in the context of an input of a PIN code, a transmission of the sequence of PIN digits may be transmitted to an e-commerce platform 100, a payment gateway 106 or to a (local) card reader for validating the PIN digits. In embodiments, if such a transmission is made, each digit may be transmitted singularly as it is input (e.g. digit-by-digit transmission), or the digits may be combined into a sequence and transmitted as a unitary sequence of digits (e.g. as a password or multi-digit PIN code), or any combination thereof. In embodiments, input and transmission in accessibility mode may be native to the device upon which it is executed (e.g. POS device) and transparent to a receiving e-commerce platform 102, payment a gateway 106, or other destination; thus, a transmission made or transmitted from a device with accessibility mode enabled is no different than a transmission from a device without accessibility mode enabled. In other embodiments, the transmission may be identified as being associated with an accessibility mode (such as for additional assessment, fraud review and the like). Optionally, where such a transmission is made, a response (e.g. incorrect PIN, transaction successful, or payment denied, or the like) from an e-commerce platform 100 or payment gateway 106 may also be received and communicated by the device, to the user.

In other embodiments, a conventional computer monitor may be substituted for the touch screen display, with controls executed on a mouse or other graphic user interface (GUI) input device (e.g. trackball, touch pad, drawing pad, and the like) to accept input of or be substituted for the disclosed swiping and tapping motions. Thus, by way of example without limitation, movement of a mouse left may be substituted for a swipe left motion, and double-clicking of a mouse button substituted for a double tap motion. In this manner, the accessibility mode and accompanying motions/controls disclosed herein may be adapted for computing devices such as a personal computer, workstation or other computing device having a non-touch screen display.

Figure 3:
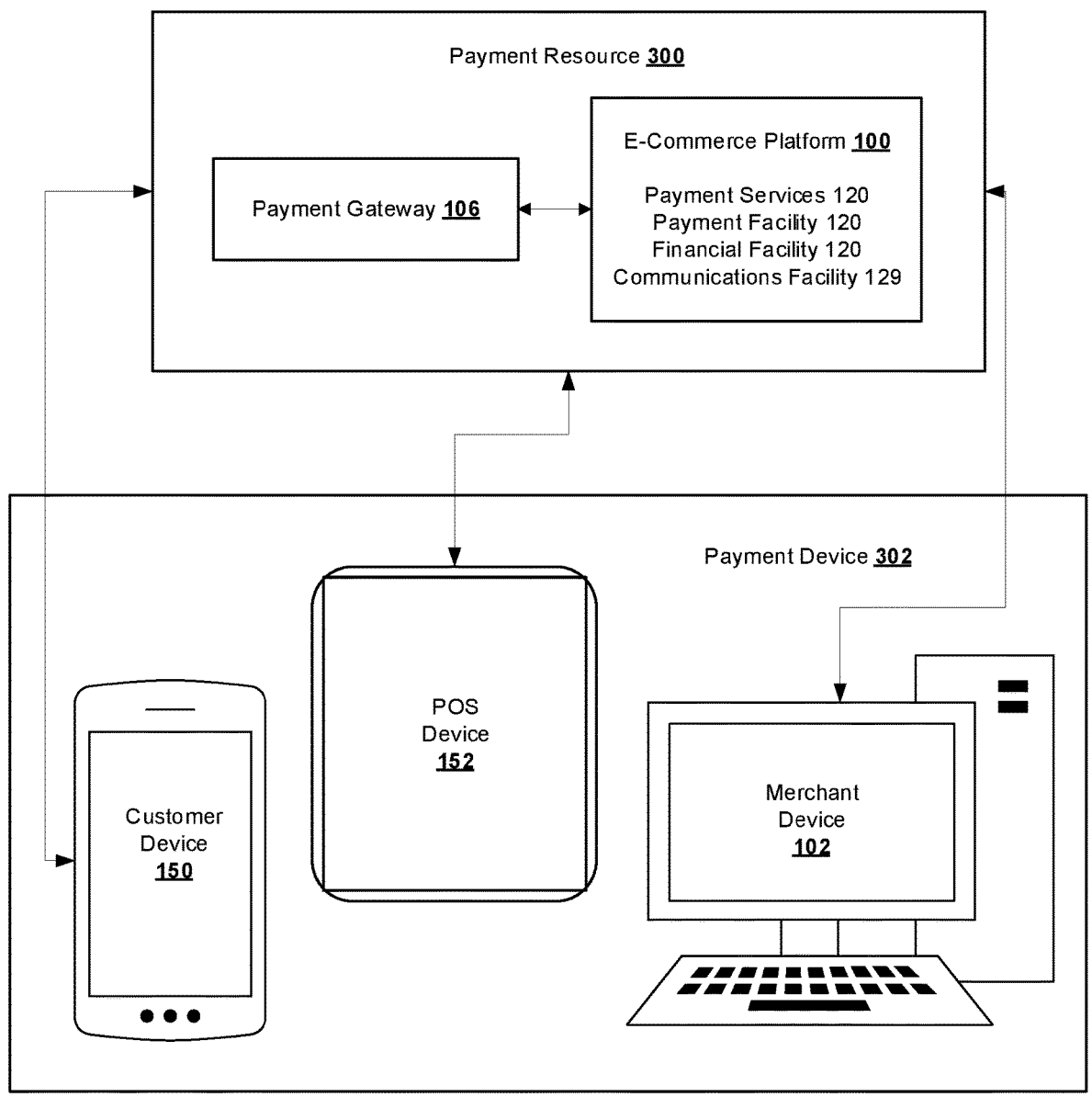
FIG. 3 depicts a logical architecture view of an embodiment.

FIG. 3 depicts an architecture view of an embodiment within a payment authentication (e.g. input of a PIN code) context including a payment resource 300 and a payment device 302. In embodiments, a payment resource 300 may be any resource, system or service for processing transactions, such as debit card transactions, credit card transactions, pre-paid card transactions, verification of identity, purchases, sales, refunds and the like. As illustrated, the payment resource 300 may include an e-commerce platform 100 or portions thereof, including but not limited to payment services 120, a payment facility 120, a financial facility 120 and a communications facility 129 as described herein. The payment resource 300 may also include systems or services external to the e-commerce platform 100 such as a payment gateway 106.

As illustrated, a payment device 302 includes various devices wherein a customer or other user may input a sequence of digits, including but not limited to a customer device 150, a POS device 152 and a merchant device 102. A customer device 150 may be a mobile and/or wireless device, a smart phone, a smart watch, a tablet, a computing device, a laptop computer, a desktop computer, a personal computer, an electronic appliance, an electronic personal assistant or any form of wearable or stand-alone device. In other embodiments, the payment device 302 can also include any computing device having a touch screen display and an output for audio, audio signals, audio instructions and the like (including as described herein). In other embodiments, the payment device 302 may incorporate a tactile output screen rather than a touch screen display. The payment device 302 may communicate with the payment resource 300 via a wired network, a wireless network, a combination or other communication means as illustrated by the arrows between the payment resource 300 and payment device 302.

Figure 4:
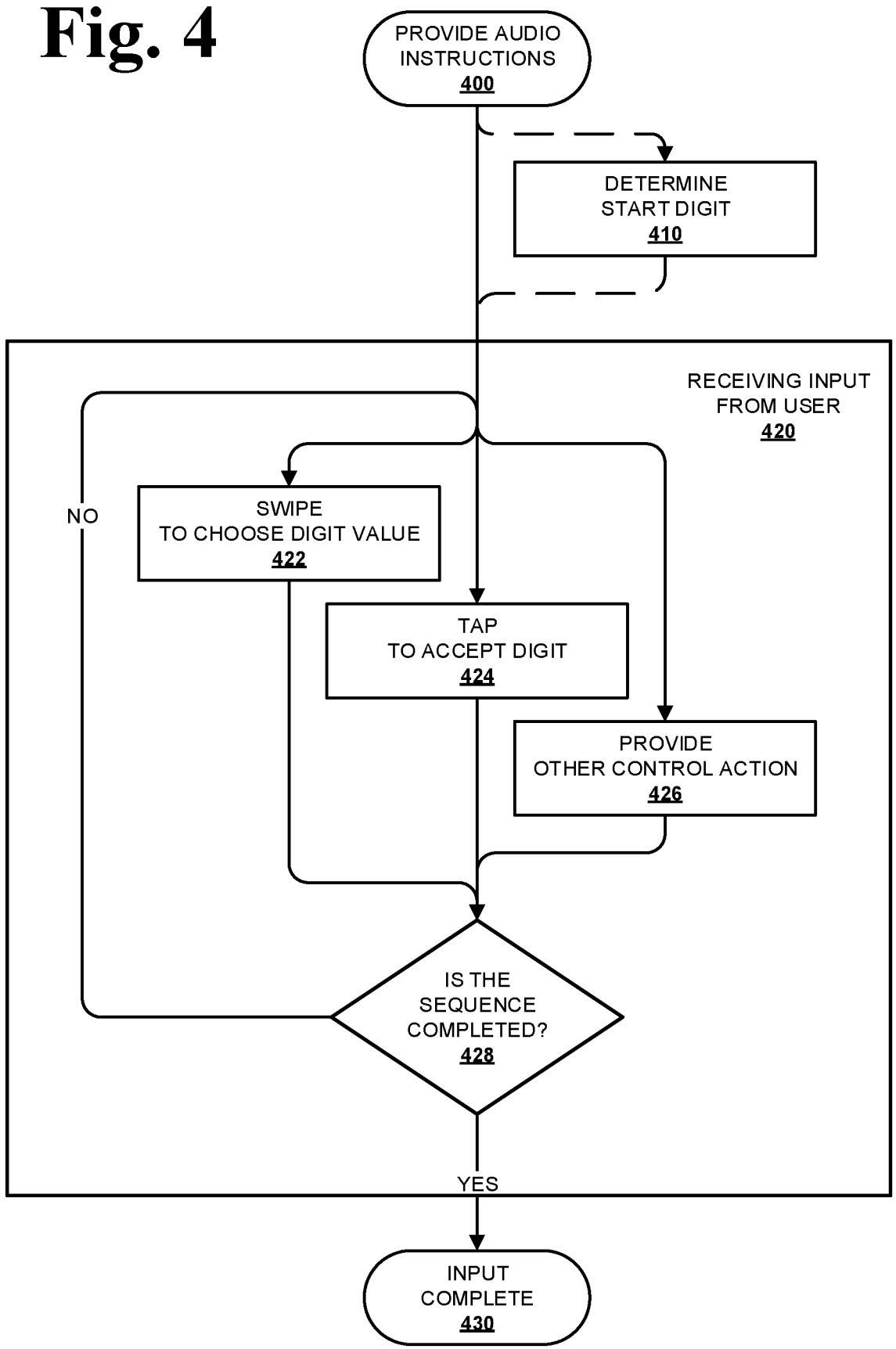
FIG. 4 is a flowchart depicting an embodiment of inputting a sequence of digits.

FIG. 4 is a flowchart depicting a method of inputting a sequence of digits. In embodiments, the sequence of digits may be numeric (e.g. single-digit whole numbers), alphabetic (e.g. A through Z, a through z, or any combination thereof), hexadecimal (e.g. single-whole numbers in addition to the letters A-F representing a numeric base-16), alpha-numeric (e.g. single-digit whole numbers plus A-Z and a-z), other character sets (e.g. ASCII and the like) or may correspond to locations on a screen, in a grid, a shape or set of shapes, a set of images and the like. For purposes of the disclosure, however, a "digit" is not limited to a single-digit definition, but rather a "digit" within this disclosure may also be construed to contain any number of numbers or characters, such as two-digit numbers (e.g. 00 through 99), three-digit numbers (e.g. 000-999), multiple character hexdecimal numbers (e.g. 00-FF), other multi-digit numbers, multiple letters or combinations thereof (e.g. double-digit alphanumeric and the like), locations on a screen, in a grid, a shape or set of shapes, a set of images and the like. In embodiments, a set of values for a given digit merely needs to be capable of being arranged in a logical order such that the control motions can increment or decrement through the set of values.

In step 400, an audio output is configured for the user to receive audio instructions or prompts throughout the remainder of the input process. Initial instructions may also be provided to the user articulating swipe or tap motions, or other controls available to the user.

As noted by the dashed lines to step 410, an optional next step of determining the starting digit may be implemented in embodiments. In this step, an initial value for the first/current digit may be set as a fixed value (e.g. 5), or a random value, or other digit value as configured or formulated for a given application or embodiment, including as described herein.

In step 420, the iterative step of receiving input from a user (e.g. swipes and taps) to input a sequence of digits is represented. This step of receiving input from the user 420 may be further represented by several possible sub-steps, namely: swiping to choose a digit value 422, tapping to accept a digit 424 and providing other control action 426, with each of these possible sub-steps followed by a processing query of whether the input sequence is completed in step 428.

More particularly, swiping to choose a digit 422 (e.g. swipe left or swipe right) allows a user to increment or decrement the value of the current digit. Audio instructions during the swiping motion may be present or not present, depending upon the desired user experience. For example, a brief pause (e.g. a few seconds) may be configured to trigger a recitation of the value of the current digit, or an audio instruction (e.g. audio prompt to accept the digit), or other action. Tapping to accept the digit 424 (e.g. double tap) allows a user to accept and confirm input of the value of the current digit and proceed to input of the next digit. Providing other control action 426 allows a user to undo a mistake (e.g. swipe up), complete the input of sequence of digits (e.g. swipe down), press an options button, or otherwise execute another control configured in the embodiment.

In step 428, a processing query may be either expressly made to the user or transparent to the user, to determine whether the iterative step of receiving input from user 420 needs to be repeated for another digit. For example, a POS device may conclude that the input sequence has been completed and iterative step 420 does not need to be repeated again because the user has completed the input of a sequence of digits (e.g. swipe up) in step 426. In other embodiments, a POS device may alternatively determine that the input of sequence of digits is complete if all four digits of a PIN code have been iteratively input by the user. If step 428 concludes that the sequence is not yet complete, then the iterative step of receiving input from the user 420 repeats until the query is satisfied either expressly by the user or internally by the device (depending upon the configuration of the embodiment).

In step 430, the overall process of inputting a sequence of digits illustrated in FIG. 4 concludes as the iterative step of receiving input from the user 420 has concluded.

Figure 5:
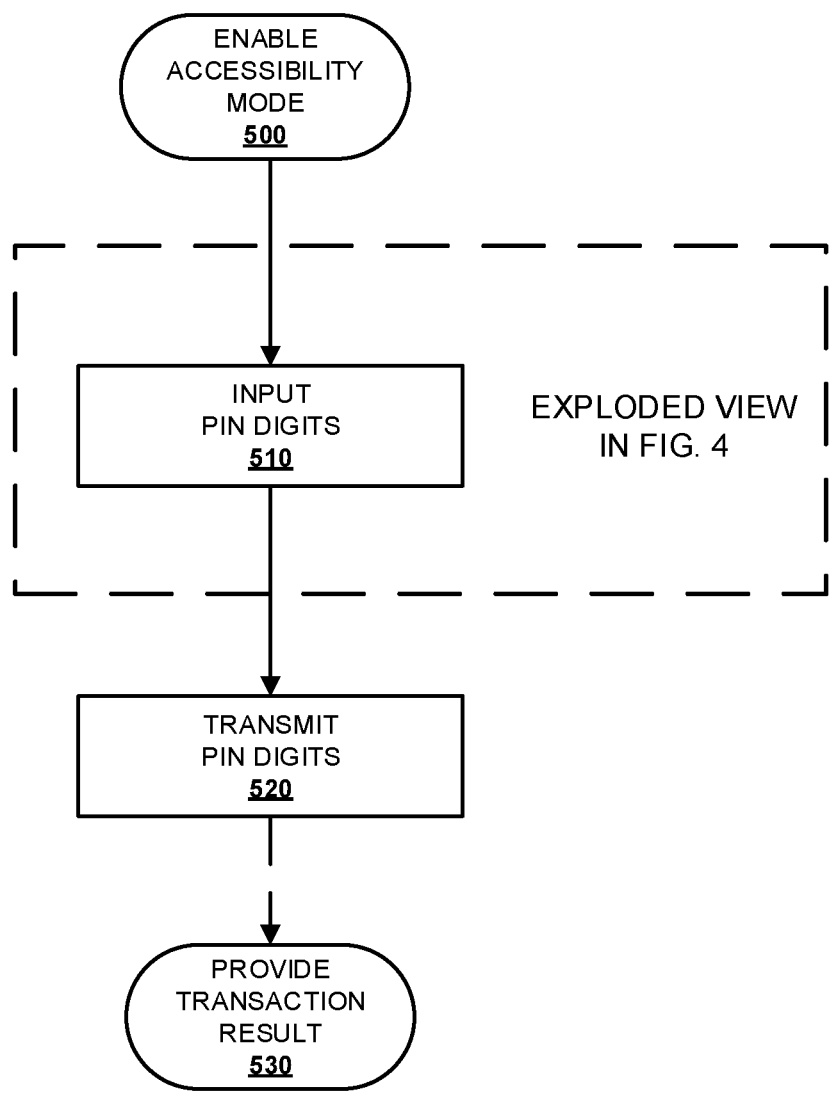
FIG. 5 is a flowchart depicting an embodiment of inputting a PIN code to complete a transaction.

FIG. 5 is a flowchart depicting a related process of inputting a PIN code in the context of authorizing a transaction. The process commences with a payment device 302 enabling accessibility mode in step 500.

Following the enabling of accessibility mode, the step of inputting PIN digits with corresponding audible prompts occurs in step 510, as previously detailed by the process and steps detailed in FIG. 4.

After the step of inputting PIN digits 510 is completed and a complete sequence of PIN digits is input, the sequence of PIN digits may be transmitted to a payment resource 300 in step 520.

In response to the transmission of PIN digits in step 520, a transaction result (e.g. transaction approved or transaction declined) may be provided in step 530.

Figure 6:
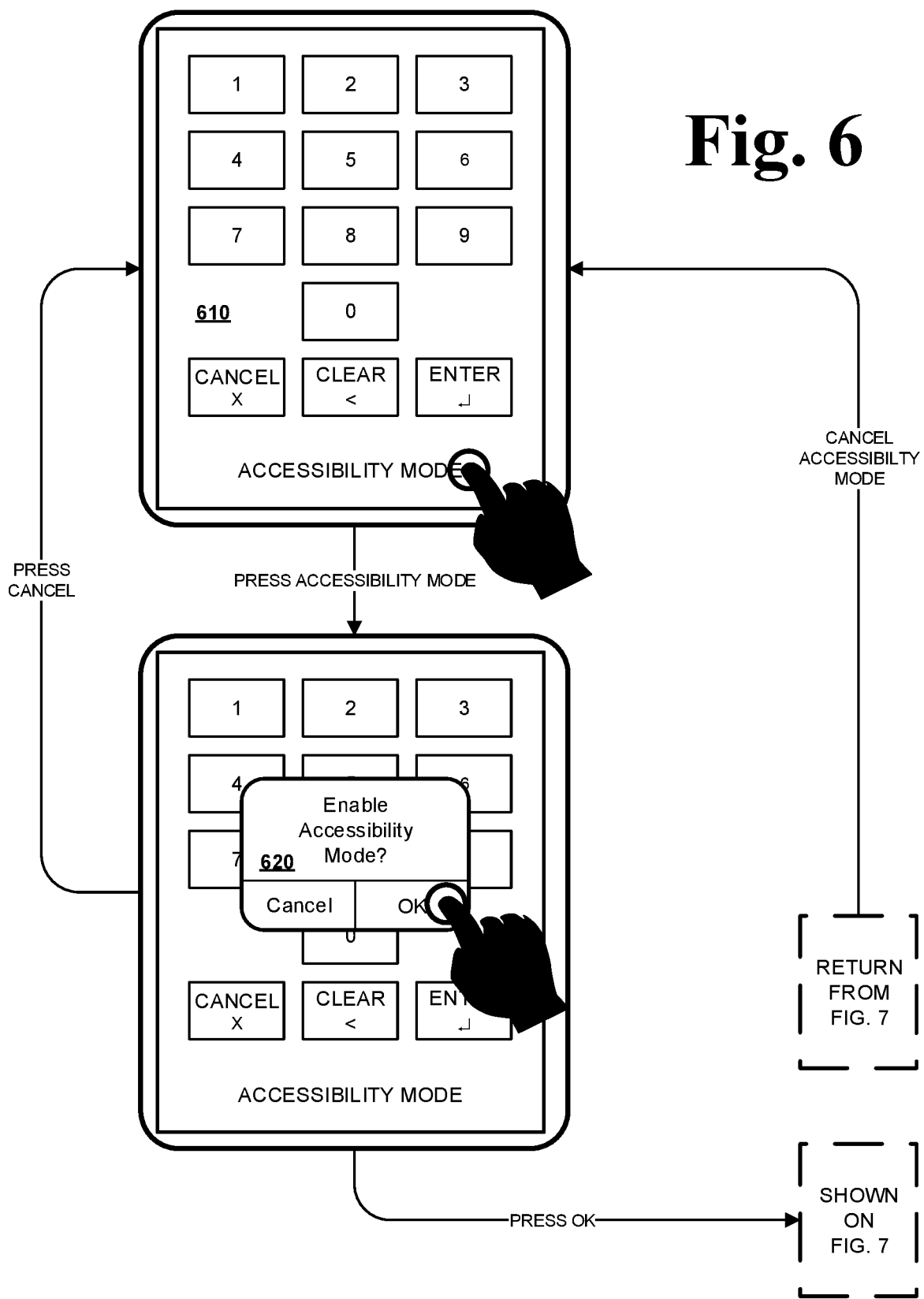
Figure 7:
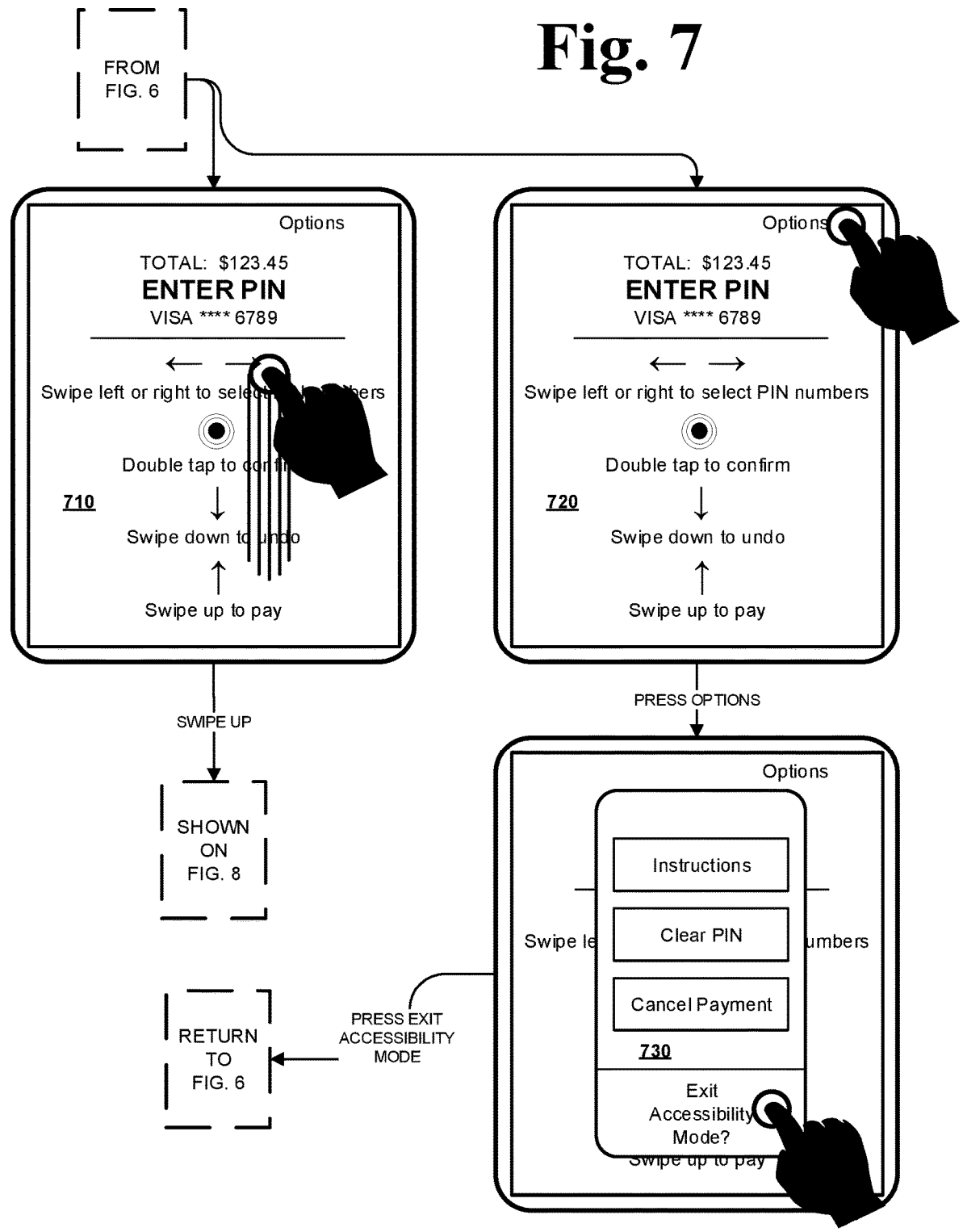

FIGS. 6 through 8 depict an embodiment of a user interface for inputting a PIN code. These figures generally follow the flowchart and process of FIG. 5 detailed herein.

FIG. 6 depicts an embodiment of a user interface and the corresponding steps for a visually impaired user enabling accessibility mode on a POS device (step 500 in FIG. 5). Screen 610 depicts a visual PIN code entry screen presented on a touch screen display where accessibility mode is not yet enabled. As illustrated, upon pressing the "Accessibility Mode" button, a confirmation dialog 620 is presented to the user.

If the user does not want to enable accessibility mode, the "Cancel" button is available to return to screen 610.

As depicted, the user presses the "OK" button as confirmation to enable accessibility mode. As the steps necessary to enable accessibility mode (step 500 in FIG. 5) are completed, and embodiment of the user interface continues in FIG. 7.

FIG. 7 depicts an embodiment of a user interface and the corresponding steps to input a PIN code with accessibility mode enabled. Screen 710 and screen 720 (identical screens if the finger/hand and corresponding motions are omitted) visually provide instructions to a user in accessibility mode. More particularly, as recited on screens 710 and 720, the user may swipe left or right to select a value or number for a PIN digit, double tap to confirm input of the PIN digit, swipe down to undo the last control (e.g. undo the last PIN digit input), swipe up to pay (confirm the sequence of PIN digits), or press the Options button on the top-right corner of the screen to access other options or controls that may be available. In embodiments, dots, stars or other visual indicators (not shown) may be provided on the screen to indicate that a digit has been entered; this may provide some feedback for a user who may be able to recognize the visual indicators.

In conjunction with enabling accessibility mode and visual instructions provided on screens 710 and 720, the following audio instructions may be provided to the user via the audio output (e.g., step 400 of FIG. 4). Audio instructions and prompts are preceded with a speaker symbol (◀) and shown in quotes and italics.

◀ "Accessibility mode enabled. Please enter your PIN. To do this, swipe left or right across the screen to cycle through each number. After finding the desired number, double tap the screen to confirm. If you make a mistake, swipe down to undo the previous digit and try again. When all the digits of your PIN have been entered, swipe up on the screen to complete payment. Enter the first digit of your PIN now."

The user then inputs PIN digits (e.g., step 510 of FIG. 5) via the iterative process of receiving input from the user (e.g., step 420 in FIG. 4), until all the digits of the sequence have been input (e.g., step 428 of FIG. 4). As contemplated by the earlier FIG. 4, and recited on screens 710 and 720, these iterative steps may include horizontal swipes to choose the value of a given digit, taps to accept or confirm a chosen digit, or other motions/controls as necessary to complete the iterative inputting of PIN digits process.

The following sample session of controls and audio prompts for input of sequence of PIN digits, such as the four-digit PIN code 1662, is provided below. Motions (e.g. swipes and taps) are preceded with a finger/hand symbol (☞)

◀ "Five" (To indicate the starting digit value)
☞ Swiping left . . . (To decrement the current/first digit value)
◀ "Four . . . three . . . two . . . one" (To identify the present value/number as swiping occurs)
☞ Double tap (To accept the current/first digit value and move to the next digit)
◀ "One confirmed" (To indicate the current/first digit value of 1 is confirmed)
◀ "One." (To indicate the initial value for the next/second digit—the value of the previous digit input)
☞ Swiping right . . . (To increment the current/second digit value)
◀ "Two . . . three . . . four . . . five . . . six" (To identify the present value/number as swiping occurs)
☞ Double tap (To accept the current/second digit value and move to the next digit)
◀ "Six confirmed" (To indicate the current/second digit value of 6 is confirmed)
◀ "Six." (To indicate the initial value of the third/next digit—the value of the previous digit input)

Note that since the previous/second digit is the same value as the current/third digit, no swiping is necessary so the user may double tap again to confirm the third digit without swiping.

☞ Double tap (To accept the current/third digit value and move to the next digit)
◀ "Six confirmed" (To indicate the current/third digit value of 6 is confirmed)
◀ "Six." (To indicate the initial value of the next/fourth digit—the value of the previous digit input)
☞ Swiping left . . . (To decrement the current/fourth digit value)
◀ "Five . . . four . . . three . . . two" (To identify the present value/number as swiping occurs)
☞ Double tap (To accept the current/fourth digit value)
◀ "Two confirmed" (To indicate the current/fourth digit value of 2 is confirmed)

In embodiments, the value of the digit may not be provided via audio, but instead the value of a digit may be provided only after the user has paused on a digit for an amount of time (for example, 2.5 seconds). In this manner a user may be able to more quickly enter a PIN without waiting for the audio for each digit and the user experience may be improved avoiding cut-off audio as digits are incremented faster than the accompanying audio.

In addition to the swipes and taps recited above, additional options may be available to the user as illustrated by the finger/hand pressing an Options button illustrated in screen 720. Upon accessing such options, a set of additional options may be presented in dialog 730 including but not limited to: providing additional help/instructions, clearing the current PIN input (e.g. either the previous digit input or all of the digits input so far, depending upon the configuration of the embodiment), cancelling the payment, or exiting accessibility mode. The latter option of disabling accessibility mode may be effected as illustrated by the finger/hand pressing the exit accessibility mode button, wherein the user returns to screen 610 on FIG. 6 (e.g. wherein accessibility mode is not enabled).

Returning to the inputting of sequence of digits of screen 710 (where accessibility mode is still enabled and four digits have been input), once all the digits of a sequence of PIN digits have been input by the user (e.g. in the example of the PIN code 1662 provided above), the following audible prompt may suggest the user swipe up to proceed and authorize the transaction.

◀ "Four digit PIN entered. Swipe up to pay. Swipe down to make changes."

The user swipes up as illustrated in screen 710. As the input of PIN digits has completed (step 510 of FIG. 5), the user experience and corresponding user interface continues on FIG. 8.

FIG. 8 depicts an embodiment of a user interface for steps following the inputting of the sequence of PIN digits. If the sequence of PIN digits was incorrect in the previous steps (illustrated by the arrow "Incorrect PIN") then screen 820 may be presented to the user. Screen 820 may be configured as an interactive screen (as illustrated) requesting that the user re-input the sequence of PIN digits (once, twice or any number of retries as configured) if another incorrect PIN is input.

◀ "PIN entered is incorrect. Please try again. Enter the first digit of your PIN now."

Upon input of a correct sequence of PIN digits (illustrated by the arrow "Correct PIN") either from screen 710 of FIG. 7 or from screen 820, screen 810 may be presented to the user while the transaction is being authorized by the payment resource 300.

◀ "Authorizing payment . . . "

If the transaction is declined, a screen 840 may be presented to the user.

◀ "Payment declined. Please try a different card or payment method"

If the transaction is approved, a screen 830 may be presented to the user.

◀ "Payment approved! Thank you. You can now remove your card and disconnect your audio connection."

Following completion of the transaction, the user may disconnect their audio connection (e.g. personal headphones, Bluetooth connection, and the like, not shown) from the audio output.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g. Long Term Evolution (LTE)) or $5^{th}$ Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A method for assisting a user in entering a sequence of digits on a touch screen display, comprising:
   receiving a user input through the touch screen display, wherein the user input includes a first motion to choose a digit and a second motion to accept the digit;
   repeating the receiving for each subsequent digit in the sequence of digits; and
   receiving another input from the user through the touch screen display,
   wherein the other user input includes a third motion confirming input of the sequence of digits is complete,
   wherein the second motion and the third motion are different types of motions,
   wherein the input from the user is independent of content displayed on the touch screen display,
   wherein a first swipe motion in a first direction increments the digit and a second swipe motion in a second direction opposite the first direction decrements the digit,
   wherein a third swipe motion in a third direction orthogonal to the first direction performs an undo operation, and
   wherein a fourth swipe motion in a fourth direction orthogonal to the first direction and opposite the third direction confirms the input of the sequence of digits is complete.

2. The method of claim 1 wherein the choosing, accepting, and confirming of the digits is controlled based on the first motion, the second motion, and the third motion without a visual-based selection as independent of content displayed on the touch screen display.

3. The method of claim 1 wherein the digits are whole numbers between 0 and 9.

4. The method of claim 1 wherein the digits are alphabetic.

5. The method of claim 1 wherein the digits are alphanumeric.

6. The method of claim 1 further comprising determining a start digit.

7. The method of claim 6 wherein the start digit is a middle digit in a set of possible digits.

8. The method of claim 6 wherein the digits are whole numbers between 0 and 9 and the start digit is 5.

9. The method of claim 6 wherein the start digit is a random digit.

10. The method of claim 1 wherein the subsequent digit starts as a previously accepted digit, wherein the subsequent digit and the previously accepted digit are identical digits.

11. The method of claim 1 wherein the first motion is a swipe motion, the second motion is a tap motion, and the third motion is a swipe motion.

12. The method of claim 11 wherein as applied to the first motion a swipe-right motion increments the digit and a swipe-left motion decrements the digit.

13. The method of claim 11 wherein as applied to the first motion a swipe-left motion increments the digit and a swipe-right decrements the digit.

14. The method of claim 11 wherein as applied to the second motion a double-tap motion accepts the digit.

15. The method of claim 11 further comprising an alternate third motion that is a swipe motion that performs the undo operation.

16. The method of claim 11 further comprising an alternate third motion that is a swipe motion that chooses a digit different from an accepted digit or chooses a different sequence of digits.

17. The method of claim 11 wherein as applied to the third motion a swipe-up motion confirms the input of the sequence of digits is complete.

18. The method of claim 11 further comprising:
   providing instructions to the user through an audio output; and
   determining a start digit following the step of providing instructions to the user;
   wherein the digits are whole numbers between 0 and 9 and the start digit is 5;
   wherein a swipe-right motion increments the digit and a swipe-left motion decrements the digit;
   wherein a double-tap motion accepts the digit;
   wherein a swipe-down motion performs the undo operation; and
   wherein a swipe-up motion confirms the input of the sequence of digits is complete.

19. A device for assisting a user to enter a sequence of digits, comprising:
   a touch screen display configured to receive input from the user;
   wherein the user inputs the sequence of digits by:
   receiving input from the user through the touch screen display, wherein the user inputs the sequence of digits by:
   swiping to choose a digit, tapping to accept the digit; repeating this procedure for each subsequent digit; and
   providing a second swiping motion confirming the input of the sequence of digits is complete,
   wherein the input from the user is independent of content displayed on the touch screen display, wherein a first swipe motion in a first direction increments the digit and a second swipe motion in a second direction opposite the first direction decrements the digit, wherein a third swipe motion in a third direction orthogonal to the first direction performs an undo operation, and wherein a fourth swipe motion in a fourth direction orthogonal to the first direction and opposite the third direction confirms the input of the sequence of digits is complete.

20. The device of claim 19 further comprising an audio output for providing instructions to the user and wherein providing instructions to the user is via the audio output.

21. The device of claim 20 wherein the audio output is headphone jack.

22. The device of claim 20 wherein the audio output is wireless.

23. The device of claim 19 wherein the device is a mobile device.

24. The device of claim 19 wherein the device is a POS device.

25. A method for assisting a user in entering a sequence of PIN digits on a payment device configured with a touch screen display, comprising:
receiving a start digit associated with a unique identifier, wherein the start digit is a middle digit in a set of possible digits to orient the user for a sequence of subsequent motions for entering the sequence of digits, wherein a first motion for entering the sequence of digits begins at the start digit;
receiving input from the user through the touch screen display, wherein the user inputs the sequence of PIN digits by:
  swiping to choose a digit, tapping to accept the digit;
  repeating this procedure for each subsequent digit; and
  providing a control confirming the input of the sequence of PIN digits is complete,
wherein the input from the user is independent of content displayed on the touch screen display,
wherein a first swipe motion in a first direction increments the digit and a second swipe motion in a second direction opposite the first direction decrements the digit,
wherein a third swipe motion in a third direction orthogonal to the first direction performs an undo operation, and
wherein a fourth swipe motion in a fourth direction orthogonal to the first direction and opposite the third direction confirms the input of the sequence of digits is complete.

26. The method of claim 25 further comprising providing instructions to the user through an audio output.

27. The method of claim 26 further comprising entering an accessibility mode prior to the step of providing instructions to the user.

28. The method of claim 25 further comprising automatically entering accessibility mode by the payment device identifying the user.

29. The method of claim 25 further comprising transmitting the sequence of PIN digits following the step of repeating this procedure for each subsequent digit.

30. The method of claim 29 further comprising providing a transaction result following the step of transmitting the sequence of PIN digits.

31. The method of claim 25 wherein the subsequent digit starts as a previously accepted digit, wherein the subsequent digit and the previously accepted digit are identical digits.

32. The method of claim 25 wherein swiping right increments the digit and swiping left decrements the digit.

33. The method of claim 25 wherein tapping to accept the digit is a double tap.

34. The method of claim 25 further comprising:
providing instructions to the user through an audio output;
entering accessibility mode prior to the step of providing instructions to the user;
determining the start digit following the step of providing instructions to the user;
transmitting the sequence of PIN digits following the step of repeating this procedure for each subsequent digit;
providing a transaction result following the step of transmitting the sequence of PIN digits;
wherein the digits are whole numbers between 0 and 9 and the start digit is 5;
wherein the subsequent digit starts as a previously accepted digit;
wherein swiping right increments the digit and swiping left decrements the digit;
wherein tapping to accept the digit is a double tap;
wherein the step of swiping and tapping further comprises swiping down to perform the undo operation; and
wherein the control confirming the input of the sequence of PIN digits is complete is swiping up.

35. A payment device for assisting a user to enter a sequence of PIN digits, comprising:
a touch screen display configured to receive input from the user, wherein the payment device is adapted to receive a start digit associated with a unique identifier, wherein the start digit is a middle digit in a set of possible digits to orient the user for a sequence of subsequent motions for entering the sequence of digits, wherein a first motion for entering the sequence of digits begins at the start digit;
wherein the user inputs the sequence of PIN digits by:
receiving input from the user through the touch screen display, wherein the user inputs the sequence of PIN digits by:
swiping to choose a digit, tapping to accept the digit;
repeating this procedure for each subsequent digit; and
providing a control confirming the input of the sequence of PIN digits is complete,
wherein the input from the user is independent of content displayed on the touch screen display,
wherein a first swipe motion in a first direction increments the digit and a second swipe motion in a second direction opposite the first direction decrements the digit,
wherein a third swipe motion in a third direction orthogonal to the first direction performs an undo operation, and
wherein a fourth swipe motion in a fourth direction orthogonal to the first direction and opposite the third direction confirms the input of the sequence of digits is complete.

36. The payment device of claim 35 further comprising providing instructions to the user.

37. The payment device of claim 36 further comprising an audio output for providing instructions to the user and wherein the providing instructions to the user is through an audio output.

38. The payment device of claim 37 wherein the audio output is configured on the payment device.

\* \* \* \* \*